UNITED STATES PATENT OFFICE.

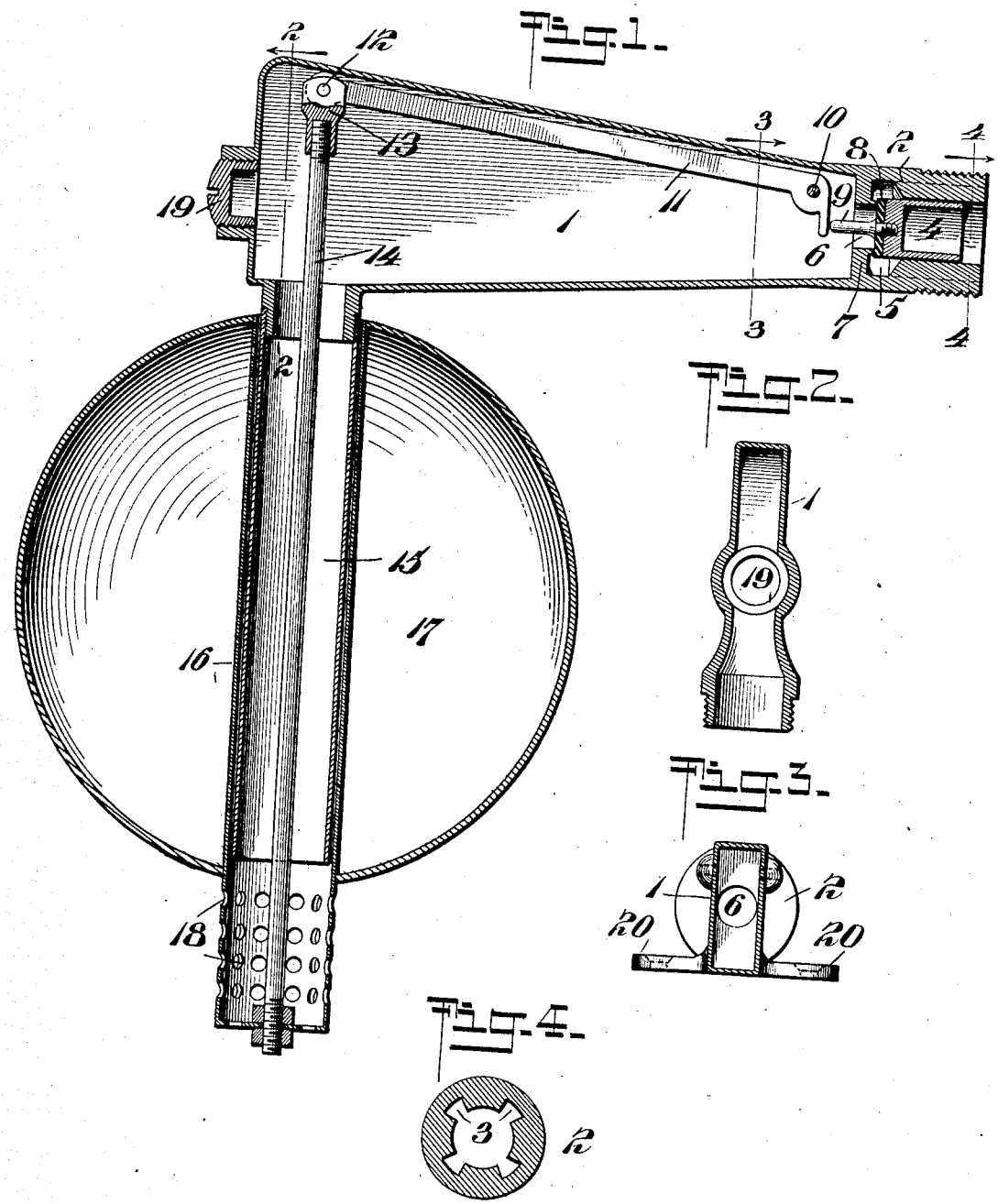

FRANK B. EASTON, OF NEW YORK, N. Y.

AUTOMATIC SUPPLY-COCK.

No. 892,815.  Specification of Letters Patent.  Patented July 7, 1908.

Application filed August 4, 1906. Serial No. 329,224.

*To all whom it may concern:*

Be it known that I, FRANK B. EASTON, a citizen of the United States, and a resident of the city of New York, borough of Manhattan, county and State of New York, have invented a new and Improved Automatic Supply-Cock, of which the following is a full, clear, and exact description.

This invention is an improved cock to automatically supply tanks and other receptacles with a liquid when the liquid becomes exhausted or sinks below a predetermined level.

Among other objects of the invention is to produce a device of this character of simple construction in which the working parts will be entirely inclosed, especially avoiding the leakage about the valve of the cock and the hissing sound usually attendant therewith when in operation. With this in view the valve is automatically seated by the pressure in the supply pipe and automatically opened against such pressure to refill the tank, by a novel arrangement of elements as hereinafter described.

Reference is to be had to the accompanying drawings forming a part of this specification, in which similar characters of reference indicate corresponding parts in all the figures.

Figure 1 is a longitudinal, central, vertical section through one embodiment of the improved cock; Fig. 2 is a transverse, sectional view on the line 2—2 of Fig. 1, looking in the direction of the arrow; Fig. 3 is a view similar to Fig. 2 on the line 3—3 of Fig. 1, looking in the direction of the arrow, the working parts of the cock being removed, and Fig. 4 is a transverse, section on the line 4—4 of Fig. 1 looking in the direction of the arrow.

The invention comprises a casing 1 preferably rectangular in cross section except at its rear end 2, where it is formed cylindrical and threaded for connecting it with the supply pipe. The bore in the end 2 of the casing is also cylindrical and provided with channels 3 in its periphery for the purpose of admitting the supply water around a valve 4 slidable in said contracted bore. A chamber 5 into which the channels 3 lead is of somewhat larger diameter than the valve, and communicates with the interior of the casing 1 through an opening 6 passing through a wall 7. Surrounding the opening 6 is a valve seat for the valve 4, coöperating with a gasket 8 on the valve for cutting off the water or other liquid from the forward part of the casing 1.

The gasket 8 is preferably held at the end of the valve 4 by a stem 9 having a shoulder and threaded into the valve as shown, the stem passing through and a slight distance beyond the opening 6.

As shown, the casing 1 uniformly increases in width as its forward end is approached and has pivotally connected on its interior on the pin 10, a bell crank lever 11. This bell crank lever, as shown, is formed with a short arm adjacent to the valve stem 9 with which it coacts. The opposite and longer arm of the bell crank lever passes to near the forward end of the casing, where it is pivotally connected at 12 to a threaded socket 13, the thread of this socket receiving the threaded end of a rod 14 passing vertically downward through a discharge tube 15 connected to the under face of the casing, and the lower end of the rod 14 being adjustably connected to the bottom of a guide tube 16 by the nuts shown, or in any other well known manner. The guide tube 16 is slightly larger in diameter than the tube 15, adapting it to freely pass thereover and reciprocate thereon in a vertical direction. To the upper end of the guide tube is attached a float 17 preferably of spherical shape, said tube passing centrally through the float and projecting slightly beyond it at its lower end where it is provided with a series of perforations 18.

A plug 19 threaded into the forward end of the casing 1 provides for the admission and removal of the bell crank lever 11 in the assembling or taking out this part of the mechanism; also ears 20 are extended at opposite sides of the casing 1 for securing the cock to the edge of a tank or the like in a well known manner.

The operation of the cock is as follows: Assuming the parts to be in the position illustrated in Fig. 1, in which position the float 17 is at the limit of its upward movement and the valve 4 is held to its seat by the pressure of the liquid behind it. On the level of the water in the tank dropping, the float 17, by reason of its weight and the weight of the parts attached to it, turns the bell crank lever on its pivot 10, operating the short arm thereof to push the valve 4 from its seat by its intermediate stem 9. This allows the water to pass from the supply pipe through the channels 3 and opening 6 into the forward part of the casing 1, down through the discharge tube 15 and out through the perforations 18 at the bottom of the guide tube 16 into the tank. As the water rises in the tank, the float 17 ascends with it, moving the bell crank lever 11 to an upward position and thereby permitting the valve to reseat and cut off the water supply.

Although I have particularly described the invention in detail, it is to be understood that the scope thereof is limited by the annexed claims only.

Having thus described my invention I claim as new and desire to secure by Letters Patent:

1. The combination of a casing, having a valve at its inner end adapted to be forced to its seat under the pressure of a liquid, a discharge tube depending from the outer end of the casing, a float slidable on the discharge tube, and means attached to the float and contained within the tube and casing adapted to press the valve from its seat under the action of the weight of the float.

2. The combination of a casing of tapering form in vertical section, having a valve at its smaller inner end adapted to be forced to its seat under the pressure of a liquid, a discharge tube depending from the outer enlarged end of the casing, a float slidable on the discharge tube, a bell-crank lever fulcrumed in the casing having a long and a short arm, with the short arm bearing on the valve, and a rod passing through the tube connecting the long arm of the lever with the float.

3. The combination of a casing, having a valve adapted to be forced to its seat under the pressure of a liquid, a discharge tube depending from the casing, a bell-crank lever fulcrumed within the casing having a long and a short arm, with the short arm bearing on the valve, and a rod passing through the discharge tube connecting the long arm of the lever with the float.

In testimony whereof I have signed my name to this specification in the presence of two subscribing witnesses.

FRANK B. EASTON.

Witnesses:
F. D. AMMEN,
JNO. M. RITTER.